A. KLEIN.

GROOVING MACHINE.

APPLICATION FILED JULY 23, 1909.

Reissued Nov. 23, 1909.

13,043.

3 SHEETS—SHEET 1.

WITNESSES:

David J. Walsh

H. A. Berrigan

INVENTOR,

ADOLPH KLEIN,

BY

Hvan Oldenweel

ATTORNEY

ANDREW B. GRAHAM CO., PHOTO-LITHOGRAPHERS, WASHINGTON, D. C.

A. KLEIN.

GROOVING MACHINE.

APPLICATION FILED JULY 23, 1909.

Reissued Nov. 23, 1909.

13,043.

3 SHEETS—SHEET 2.

WITNESSES:

David J. Walsh.

W. H. Berrigan.

INVENTOR,

ADOLPH KLEIN,

BY

Howard Deemeel

ATTORNEY.

ANDREW B. GRAHAM CO., PHOTO-LITHOGRAPHERS, WASHINGTON, D. C.

A. KLEIN.

GROOVING MACHINE.

APPLICATION FILED JULY 23, 1909.

Reissued Nov. 23, 1909.

13,043.

3 SHEETS—SHEET 3.

WITNESSES:

David J. Walsh

H. H. Berrigan

INVENTOR,

ADOLPH KLEIN,

BY

Frank Oldenweel

ATTORNEY.

ANDREW. B. GRAHAM CO., PHOTO-LITHOGRAPHERS, WASHINGTON, D. C.

UNITED STATES PATENT OFFICE.

ADOLPH KLEIN, OF NEW YORK, N. Y., ASSIGNOR TO MITRED BOX COMPANY, OF NEW YORK, N. Y., A CORPORATION OF NEW YORK.

GROOVING-MACHINE.

13,043. Specification of Reissued Letters Patent. Reissued Nov. 23, 1909.

Original No. 861,735, dated July 30, 1907, Serial No. 362,684. Application for reissue filed July 23, 1909. Serial No. 509,242.

*To all whom it may concern:*

Be it known that I, ADOLPH KLEIN, a citizen of the United States of America, residing in the borough of Manhattan, city and State of New York, United States of America, have invented a new and useful Grooving-Machine, and do hereby declare the following to be a full, clear, and exact description of the same.

These improvements relate, especially, to means for grooving heavy paste-board for the production of box-blanks, and the object of the present invention is to provide durable means for economically forming one or more V-shaped grooves in the surface of a sheet of heavy paste-board, or the like, by cutting the stock from said board or sheet.

In the manufacture of the box-blank and box described and claimed in my pending application, Serial No. 346567, for United States patent, I have had great difficulty in providing a machine for cutting a sheet of heavy paste-board, to form therein the V-shaped grooves necessary to constitute the lines of fold between the bottom and side and end panels of the box-blank, and to constitute the beveled edges of such side and end panels. Owing to the nature of the material (heavy paste-board) a milling cutter has proved quite useless, and stationary knives have, in practical experiments, so rapidly lost their cutting edges as to render their employment highly disadvantageous.

The experiments conducted by me, for the purpose of cutting V-shaped grooves in the surface of a sheet of heavy paste-board, have resulted in the production of the novel grooving-device and machine hereinafter described and the characteristic features of which are especially pointed out in the claims.

Figure 1:
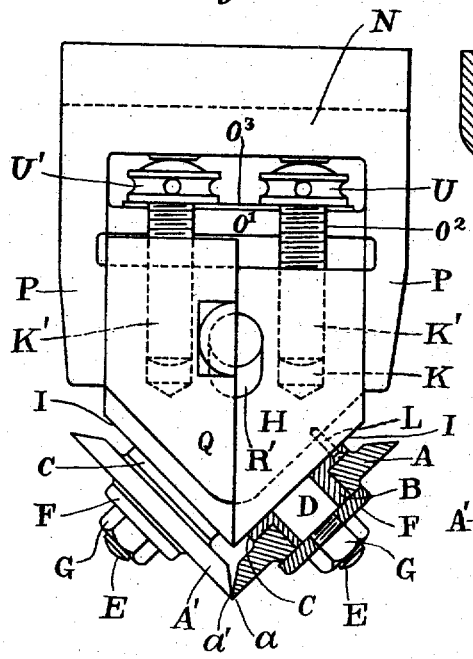
Figure 2:
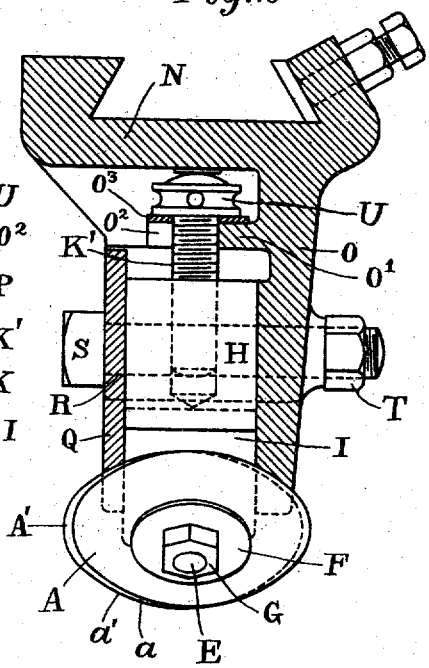
Figure 3:
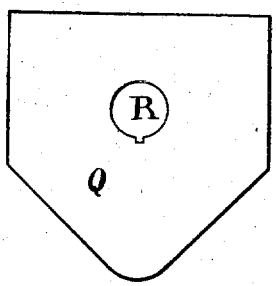
Figure 4:
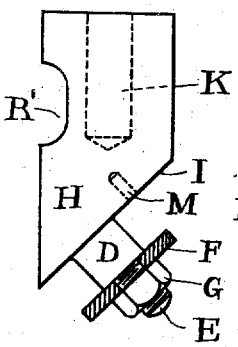
Figure 5:
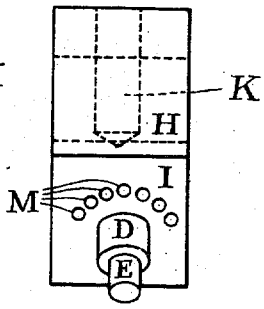
Figure 8:
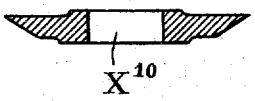
Figure 7:
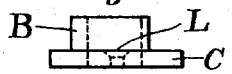
Figure 6:
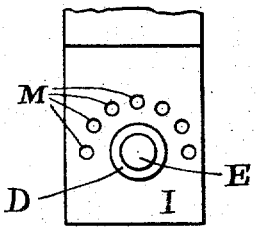
Figure 10:
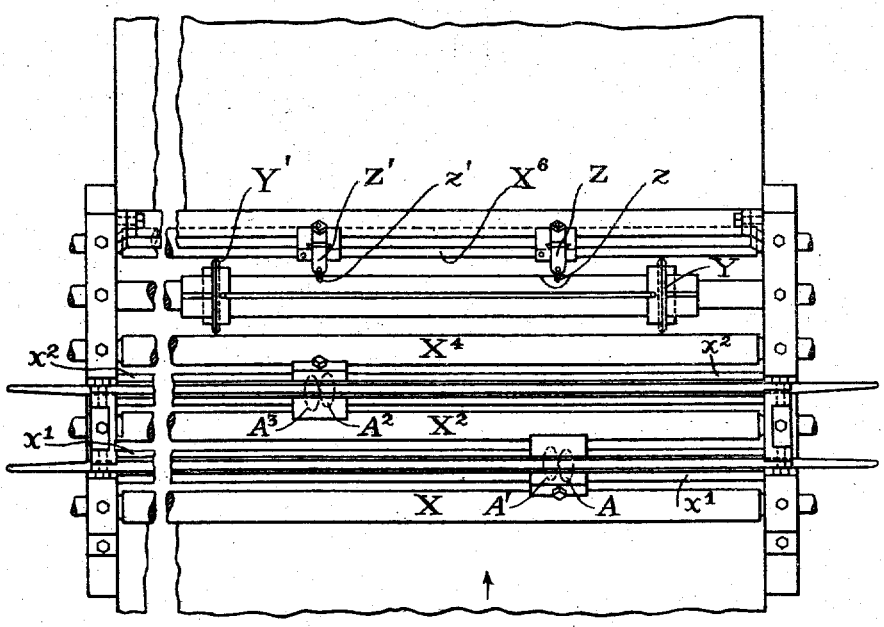
Figure 9:
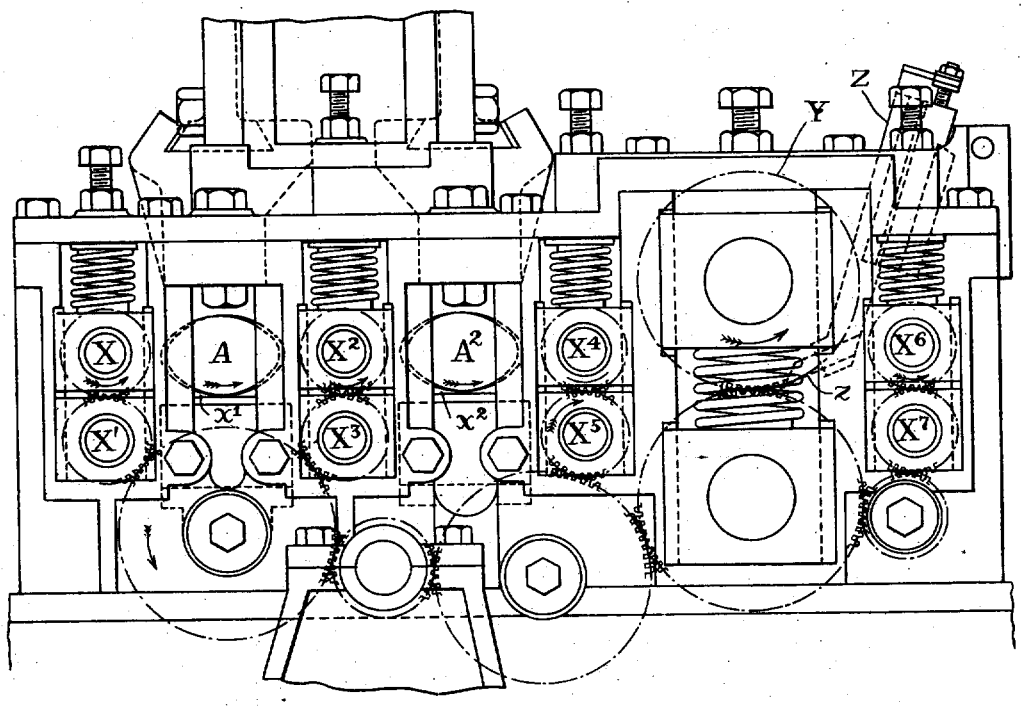

Referring to the accompanying drawings, Figures 1–8 illustrate the details of the new grooving-device invented by me, and Figs. 9 and 10 are side and top views of the machine, also invented by me, and which employs said grooving-device. Fig. 1 is a front view, partly cut away, of the new grooving device; Fig. 2 is a similar side view thereof; Fig. 3 is a view of the front plate for the holder of the grooving-device; Fig. 4 is a front view of one of the knife-holding blocks; Fig. 5 is a side view of one of said blocks; Fig. 6 is a bottom view of such a block; Fig. 7 is a side view of the eccentric-bushing upon which a circular knife is journaled, and Fig. 8 is a cross-sectional view of a knife employed by me.

The grooving device (especially shown in Fig. 1) invented by me comprises a pair of circular knives, A and $A^1$, arranged so as to have their cutting edges disposed toward one another. In the drawings (see also Fig. 8) I have shown plain flat circular plates or blades having the entire outer edge beveled so as to provide the knives with sharp cutting edges $a$ and $a^1$, and two knives are shown (Fig. 1) as arranged at right angles with respect to one another, at opposite sides of the median line of the grooving device, and with their outer edges (the cutting edges $a$ and $a^1$) nearly in contact at the lowest point of the grooving device.

The form of knife (and both of which may be alike in each grooving device) preferably used by me is, as shown in Fig. 8, provided with a concentric opening, $X^{10}$, and by means of such opening, the knife is (Fig. 1) journaled and freely rotatable upon a bushing B—see also Fig. 7—which is bored eccentrically and is provided with an annular flange C, at one end. The bore of such bushing fits upon a pin D, whose outer free end E, is provided with a screw thread. The knife, as stated, freely revolves around the bushing B, and is held between the flange C of said bushing and a washer F, held in place by a nut screwed upon the threaded end E.

Each grooving device may comprise two closely-engaging and separately-movable blocks, H, and each block carries an axial support or pin (D), hereinbefore referred to projecting from the diagonally-disposed bottom face I, so as to be preferably at an angle of 45° with respect to the vertical line of the block. By this arrangement, the two knives are arranged at right angles with respect to one another, as preferred.

Each block H is preferably of the form shown in Figs. 4, 5 and 6, and is provided with a series of threaded holes M in its bottom face I, and concentric with the axial support or pin D. The flange C, of bushing B (previously referred to) is provided with a counter-sunk opening I, (Fig. 7), and a screw is—see Fig. 1—passed through said opening and that one of the openings M with which it is desired to register.

It is obvious that, upon removal of knife A, the bushing may be turned so as to bring its opening L into register with any of the openings M, and when so shifted and locked, the axis (bushing) of the knife will be correspondingly shifted, and the relative adjustment of the two knives may thus be changed or maintained as desired. Where each knife surrounds an adjustable bushing, or is otherwise adjustable independently of its block I, exceedingly fine variations in relation of the two knives may be assured.

The two blocks I are held side by side in a grooving head (best shown in Figs. 1 and 2) consisting of a shell having a top N, back O, and side-plates P P. The front and the bottom of said head are open. Each block is provided with a threaded bore K, and screw bolts $K^1$ are screwed into said bores. The bolts are provided with heads, U and $U^1$, and each bolt (both having previously been passed through openings in a plate $O^3$) is then slipped into a corresponding slot, $O^2$, formed in a cross-rib $O^1$ of the head.

The blocks I, having been fitted, side by side, in the head, a front-plate Q (Fig. 3) is fitted to the front of the head, and a bolt S is passed through an opening R in said front plate, through elongated grooves $R^1$ (Fig. 4) in the adjacent faces of blocks I—the two grooves thus forming a slot—and through an opening in the back O of the head, and a clamping nut T is fitted to the end of the bolt, at the rear of the head. Upon unscrewing the nut T, both blocks I will be loosened, and either block may be independently adjusted, vertically, upon turning the head, U or $U^1$, of the screw $K^1$ engaging the same. After each adjustment, the blocks may be locked into position by tightening the nut T.

The grooving-device invented by me is thus capable of relative adjustment of the knives A and $A^1$, by varying the axis of a knife or by varying the position of a block which carries a knife, and when the illustrated form of grooving-device is employed, exceedingly fine relative adjustment of the knives, as well as a wide range thereof, may be assured.

In operation, the grooving head engages a cross-bar, and the sheet of paste-board, or other material, is, preferably, passed underneath and in close contact with the adjacent cutting edges $a$ and $a^1$ of the knives. The feeding of the sheet of material causes the rotation of the knives, and the forming thereby of two parallel cuts, inclined toward one another (at right angles, or otherwise), in the upper face of the sheet, and without removing the stock from between said cuts. The knives are, in the form illustrated, separately and freely rotatable, the movement thereof being entirely due to engagement with and passage of the sheet of material. It has been found, however, that there is a tendency of the material, between the cuts, to rise up and clog between the knives A and $A^1$, and to overcome that I have arranged one of each pair of knives in advance of the other of that pair, as shown in Fig. 2, where $A^1$ is in advance of A, or as shown in Fig. 10, where A is in advance of $A^1$, and $A^3$ is in advance of $A^2$. As the result of practical experiments, I have found that the stock does not crowd between the knives, when one is advanced beyond the other, and I prefer, therefore, to employ such arrangement of knives.

The grooving device or grooving head hereinbefore described may be supported in any suitable way, and the sheet of heavy paste-board, or other material, may be fed thereto by any suitable means.

The sheet of heavy paste-board, or other material, is passed between a set of knives and a fixed flat table ($x$ $x^1$ Figs. 9 and 10), the object thereof being to hold the sheet of material stiff and flat while passing underneath and being cut by the knives, resulting in the production of a cut of even depth and uniform shape throughout. The use of a fixed flat table is especially advantageous when I employ knives one of which (as before described) is advanced beyond the other, as there would then be a tendency to bend the sheet of material when a circular rotatable table is used. In the case of the employment of a fixed table, it is necessary, of course, to use feeding means other than the table. In my machine, the sheet of material is advanced or fed by the rollers X—$X^1$ and $X^2$—$X^3$.

Preferably, the machine employed is provided with a plurality of grooving devices, so as to provide two or more sets of cuts in the sheet of material, whereby the sheet may be given two or more parallel preliminary grooves, constituting the opposite lines of fold of the box-blank.

Inasmuch as it is very desirable to connect the grooving-devices with the machine so as to form preliminary grooves at any desired distance apart, I have preferred to adjustably secure adjacent grooving devices to separate bars and in staggered relation as shown in Figs. 9 and 10, wherein the knives A and $A^1$ are the cutting members of one grooving device, while the other grooving device is provided with the rotatable blades $A^2$ and $A^3$. Owing to the staggered relation of the grooving devices, they may be arranged at any distance apart, and even one nearly behind the other, so as to form preliminary grooves quite close together. Any number of grooving devices may be attached to the machine, depending upon the number of the grooves to be cut, and the distance between the same; preferably, however, the successive or adjacent grooving devices will be staggered, as before described.

In the machine devised by me, and illustrated in the accompanying drawings, I have provided (see Figs. 9 and 10) several sets of feed-rolls, for moving the sheet of heavy paste-board or other material, while being worked upon. At the front of the machine, the rolls X and $X^1$ are provided to feed the sheet (in the direction of the arrow, Fig. 10) to the knife-blades A and $A^1$; a second set of rolls, $X^2$, $X^3$, are provided to engage the sheet and force it toward the second set of knives $A^2$ $A^3$, and a third set of rolls $X^4$ $X^5$ then force the sheet (provided with two parallel preliminary grooves) into engagement with splitting means, hereinafter described, and a final set of rolls $X^6$ $X^7$ grip the sheet, or strips cut therefrom and pass it from the machine. Thus the sheet is firmly held, at all times, while passing through the machine, irrespective of the operations thereon.

The splitting device employed may be of any desired form, but I prefer to use a splitting device comprising upper and lower circular blades whose adjacent edges are in contact. Preferably there will be several sets, Y and $Y^1$, of splitting blades, so arranged with relation to the grooving devices as to have the splitters divide the sheet into one or more strips, each of which has two preliminary grooves, as required for a box-blank, while the edges of such strips subsequently become the outer edges of the side panels or end panels of such blank-box. It is to be understood, of course, that the splitting devices are adjustable upon the shafts which support them, in order to cut any width of strip desired, and that the number of such splitting devices will be varied according to the number of strips to be produced from a single sheet.

Beyond the splitting devices, or at the rear of the machine I provide a number of plows, Z, $Z^1$ (Fig. 10), corresponding in number and alined with the grooving devices. Each plow may consist of a frame (as shown in Fig. 9) adjustable lengthwise of a rear bar of the machine to correspond with an adjusted position of a grooving device, and also adjustable vertically for grooves of different depths in the material. Each plow may have a point $z$ or $z^1$, for which purpose I prefer to employ short square steel rods fitted into suitable openings in the frames aforesaid, and cut diagonally or otherwise sharpened at both ends, whereby either end may be used as the plow point.

The operation of the machine is as follows: A sheet of material is first gripped between the rollers X and $X^1$ and pushed into engagement with the first grooving device, the blades A and $A^1$ of which force the material down upon the fixed table $x^1$ and form parallel cuts inclined toward each other in the moving sheet without removing the stock; the sheet is next gripped between the rollers $X^2$ and $X^3$, and pushed into engagement with the next gripping device, the blades $A^2$ and $A^3$ of which force the material down upon the fixed table $x^2$ and form two cuts parallel with those first named and inclined toward one another in the moving sheet; the sheet is next gripped between the rollers $X^4$ and $X^5$, and pushed into engagement with the splitters Y and $Y^1$ which divide the sheet at opposite sides of the two sets of cuts mentioned; the strips of the sheet are then fed so as to have the plow points $z$ and $z^1$ enter between the sets of cuts and remove the stock therefrom leaving clean-cut V-shaped grooves in the strips, which are then gripped between the rollers $X^6$ and $X^7$ and passed out of the machine. It will be seen, therefore, that the grooving and splitting of the sheet of heavy paste-board, or other material, is accomplished without halting such sheet, which may be moved through the machine at any speed desired.

What I claim is:—

1. A grooving machine comprising three sets of feed-rolls for passing a sheet of paste-board, or the like, through the machine, a grooving device located between the first and second sets of feed-rolls and a grooving device located between the second and third sets of feed-rolls.

2. A grooving machine comprising three sets of feed-rolls for passing a sheet of paste-board, or the like, through the machine, a device located between the first and second sets of feed-rolls for forming a groove in said sheet, and a device located between the second and third sets of feed-rolls for forming a second groove, parallel with the first, in said sheet, in combination with means for cutting entirely through said sheet and splitting the same along a line parallel with both grooves aforesaid.

3. A grooving machine comprising means for feeding a sheet of paste-board, or the like, through the machine, devices for forming parallel grooves in said sheets, means for cutting entirely through said sheet and splitting the same along a line parallel with both grooves aforesaid, and means for thereafter removing the material from the said grooves of the sheet split as aforesaid.

4. In a grooving machine, a grooving device comprising a circular knife, a movable eccentric bushing with which said knife is rotatably conenected, and means for adjusting said bushing as desired, in combination with a rotatable circular knife whose cutting edge is disposed toward the cutting edge of the knife first named.

5. In a grooving machine, a grooving device comprising a pair of rotatable circular knives having their cutting edges disposed toward one another, blocks carrying said knives, means for adjusting the arrangement of each knife upon the block which carries it, and means for adjusting each block separately.

6. In a grooving machine, a grooving device comprising a block having a projecting pin and a series of openings around said pin, an eccentric bushing fitting said pin and provided with an opening to be brought into register with any of the first mentioned openings, and a circular knife rotatably carried by said bushing.

7. In a grooving machine, an eccentric bushing, means for adjusting the position of the bushing around an axis, and a circular knife mounted on and rotatable around the bushing.

8. In a grooving machine, a grooving device comprising a block, means for adjusting said block, and a circular knife carried by said block and rotatable about an axis which is eccentrically adjustable relatively to the latter.

9. In a grooving machine, a grooving device comprising a block having a projecting pin, an eccentric bushing adjustably fitting said pin, and a circular knife rotatably carried by said bushing.

10. In a grooving machine, a grooving device comprising a pair of rotatable circular knives having their cutting edges disposed toward one another, and one of said knives being disposed in advance of the other, in combination with a fixed support beneath the knives for the material to be grooved, and feeding means for moving the material over said fixed support and in contact with said knives.

11. In a grooving machine, a grooving device comprising a pair of rotatable circular knives having their cutting edges disposed toward one another, in combination with a fixed support for the material to be grooved and located beneath the cutting edges, disposed as aforesaid, of the knives, and feeding means for moving the material over the fixed support and in contact with the knives.

In testimony whereof, I have signed my name to this specification in the presence of two subscribing witnesses.

ADOLPH KLEIN.

Witnesses:

ALFRED ROWELL ANDERSON,
W. H. BERRIGAN.